Dec. 2, 1952     H. GRANDGIRARD     2,619,978
CENTRIFUGAL VALVE DEVICE FOR CONTROLLING FLUID OPERATED CLUTCHES
Filed Jan. 26, 1946
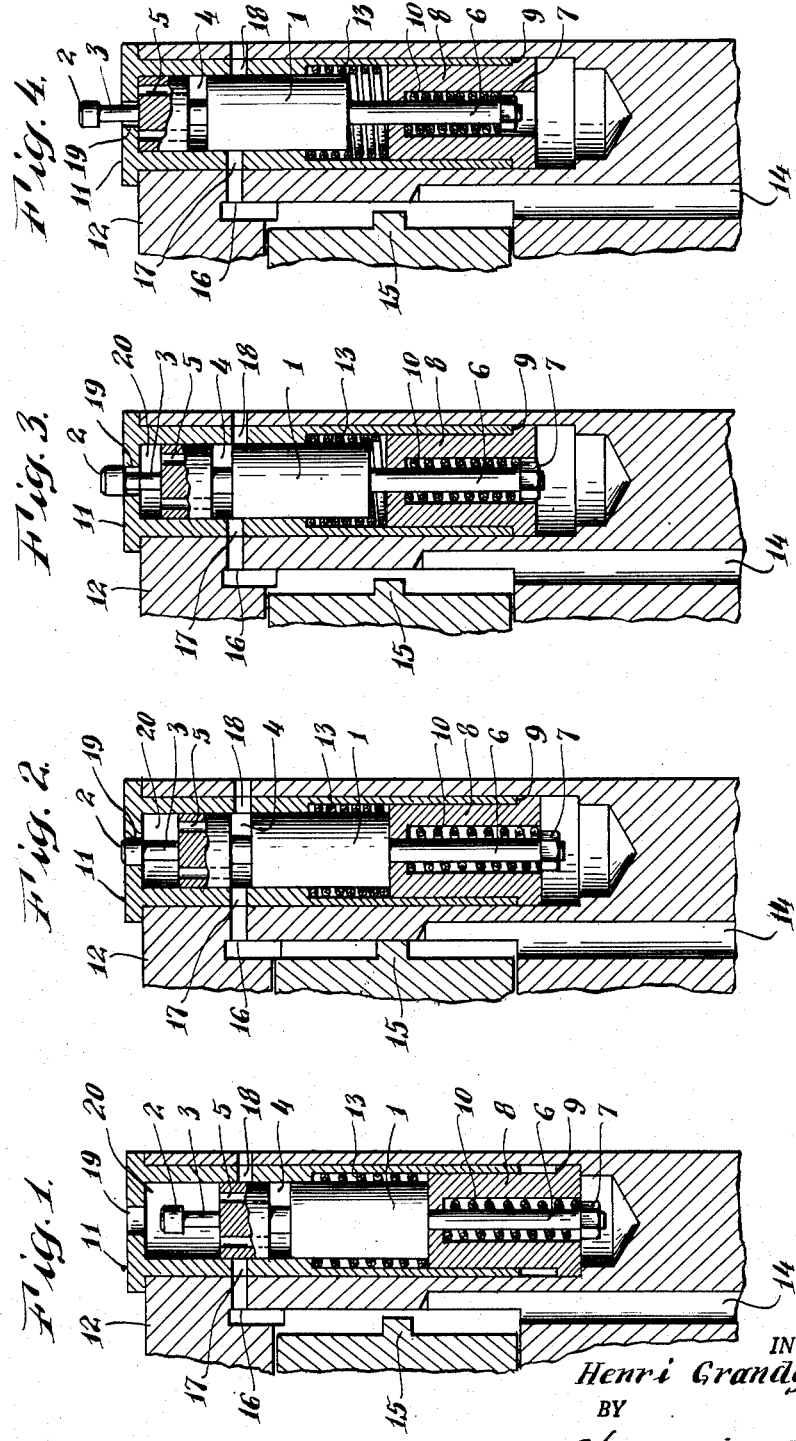
INVENTOR.
Henri Grandgirard
BY
AGENTS.

Patented Dec. 2, 1952

2,619,978

UNITED STATES PATENT OFFICE 2,619,978

CENTRIFUGAL VALVE DEVICE FOR CONTROLLING FLUID OPERATED CLUTCHES

Henri Grandgirard, Puteaux, France, assignor to Société des Brevets Kegresse, S. E. K., Paris, France, a corporation of France Application January 26, 1946, Serial No. 643,808
In France June 19, 1944

Section 1, Public Law 690, August 8, 1946
Patent expires June 19, 1964

5 Claims. (Cl. 137—53)

1

Several constructional arrangements of centrifugal valves for clutches having hydraulically compressed plates or discs are known which enable the automatic engagement and disengagement of the clutch to be obtained for predetermined speeds of rotation, such as those described in our British Patents Nos. 489,317 dated July 25, 1938 and 496,466 dated November 30, 1938.

However, centrifugal valves of this kind do not enable the clutch plate which they control to be compressed when the engine is stopped, even if a pressure fluid is available.

The actual principle on which these valves operate consists in leaving the compression chamber of the disc in communication with the outside, so long as the engine and consequently the movable part of the clutch has not reached a predetermined speed of rotation. It is therefore impossible to start the engine by driving it through movement of the vehicle, which is common practice and is even often necessary at the present time with engines supplied with producer gas, the auxiliary starting apparatus being often found to be too weak to start a cold engine.

It is an object of the present invention to overcome this disadvantage by providing a centrifugal valve which enables the disc of the clutch to be compressed while the engine is stationary.

According to the invention, a centrifugal valve for a hydraulic clutch comprises an assembly consisting of two relatively movable members, each urged by a separate spring in a direction opposite to that produced by the centrifugal force, the said assembly having a starting position in which the fluid discharge from the clutch is closed and thereby enabling the engine, when stationary, to be coupled to the drive.

It is thus possible to drive the engine by pulling or pushing the vehicle one of the gears of the change speed gear being engaged. The valve furthermore produces a very gradual engagement of the clutch, and an instantaneous disengagement thereof for a lower speed of rotation of the engine than the speed of engagement.

The accompanying drawings show an exemplary embodiment of the invention and illustrate in cross-section the various positions taken up by the valve during operation, according to the speed of rotation of the engine. In said drawings;

Figure 1 illustrates the position of the valve with the engine stationary (position for starting);

Figure 2 is the position with the engine idling (position for engagement of the clutch);

2

Figure 3 is the position with the engine accelerated (position at the end of the period of gradual engagement of the clutch); and Figure 4 is the position for normal running (position of complete engagement of the clutch).

The centrifugal valve according to the invention comprises two distinct parts viz a valve proper 1 and a mass 8.

The valve 1 is cylindrical and carries at its outer end a piston valve 2 connected to the valve body by a rod 3. The valve is formed with a peripheral groove 4 which communicates with the outer end of the valve chamber through holes 5. At its inner end, a rod 6 extending from the valve carries at its end a nut 7. The mass 8, which has a bearing flange 9 at its inner end, is resiliently coupled to the valve by a retracting spring 10.

The assembly designated by the reference 1 to 8 is adapted to move in a lining 11 which is closed at its outer end and is secured in the clutch plate 12, the inner end of the housing for said lining acting as an inner abutment for said assembly and the latter being held in the inner inoperative position by a spring 13 bearing at one end against a shoulder of said lining, and at the other end against the mass 8.

The circulation system for the fluid comprises a duct 14 for conveying the fluid behind the piston 15 which compresses the clutch disc (not shown), and a duct 16 for discharge of the fluid. In the lining 11 there are provided three openings 17, 18 and 19, the first, which is directed laterally, communicating with the fluid outlet duct 16, the second, which is also directed laterally, communicating with the outside of the clutch plate, and the third, which is directed axially, also communicating with the outside of said plate. The lateral openings 17 and 18 are controlled by the groove 4 of the valve, and are slightly staggered in the axial direction in such manner that the opening 18 is uncovered and then again covered before the orifice 17 during the outward displacement of the valve 1. The opening 19 is controlled by the piston valve 2.

The operation of the valve is as follows:

When the engine is stopped, the whole assembly is in the position of Figure 1 under the urge of the springs 10 and 13, the outer cylindrical part of the valve 1 covering the openings 17 and 18. The chamber behind the piston 15 can therefore be supplied with pressure fluid through the duct 14 in order to compress the clutch plate and thereby effect connection between the drive of the vehicle and the engine; the engine can therefore be started by the movement of the vehicle, one of the gears of the change speed gear being engaged. The necessary pressure fluid can be supplied, for the purpose of this operation, either by an accumulator or a pump with an independent drive, or may be actuated by the drive of the vehicle.

In this position, the piston valve 2 uncovers the opening 19 in order to prevent the accumulation of fluid in the chamber 20, which is liable to hinder the subsequent operation.

As soon as the engine is running, the assembly formed by the valve 1 and the mass 8 is urged outwardly by the centrifugal force acting in opposition to the spring 13 which is arranged to balance this force until the speed for starting the engine is reached, which speed will always be lower than the idling speed of the engine.

The engine having started and its speed increased, the spring 13 can no longer counteract the centrifugal force which acts on the valve-mass assembly, which then assumes the position of Figure 2. The flange 9 of the mass 8 abuts against the edge of the lining 11 and the groove 4 of the valve 1 is located opposite the openings 17 and 18, placing the rear of the piston 15 in communication with the outside of the plate through the duct 16. The pressure drop thus obtained causes the drive to be released. In this position, the piston valve 2 closes the opening 19.

As long as the speed of rotation of the engine does not exceed a predetermined speed of operation, the centrifugal force, which acts now only on the valve 1 (the mass 8 no longer being involved, since it has been arrested by the lining 11) will be overcome by the spring 10 and the valve will remain in the position of Figure 2, in which position the fluid escapes freely through the openings 17 and 18. The pressure behind the piston 15, as well as that in the chamber 20, which is in communication with the groove 4 through the holes 5, will be practically zero, and the clutch will remain disengaged.

If the speed of the engine further increases, the centrifugal force acting on the valve 1 will become greater than the force of the spring 10, and the valve, by moving outwardly, will gradually cover the openings 17 and 18. The discharge of the fluid being thus slowed down, the pressure will gradually increase behind the piston 15, in the groove 4, and also in the chamber 20, where its action will be added to that of the spring 10 to oppose the centrifugal force. The pressure will therefore increase proportionally to the centrifugal force, after deducting, of course, the force of the spring 10. A very gradual engagement of the clutch is thus obtained.

The weight of the valve 1 and the tension of the spring 10 are so determined that the centrifugal force balances the maximum pressure of the fluid when the chosen speed of rotation is reached. The valve then assumes the position shown in Figure 3, completely covering the opening 18 and causing total engagement of the clutch.

At this instant, the piston valve 2 comes out of the axial orifice 19 and immediately places the chamber 20 in communication with the outside of the plate. The pressure within said chamber immediately drops and the valve, now urged only by the spring 10, assumes the position of Figure 4 and abuts against the end wall of the lining 11, thereby completely covering the openings 17 and 18, the orifice 19 being fully open. This is the position for normal running.

Engagement of the clutch having been obtained for a predetermined speed of rotation, the speed of the engine can decrease considerably, without causing the valve 1 to open, since said valve is now urged inwardly only by the spring 10, the pressure of the fluid no longer being exerted on it.

The openings 17 and 18 will remain closed, and the orifice 19 will remain open just as long as the centrifugal force exerted on the valve 1 is greater than the force of the spring 10. When the centrifugal force becomes weaker than the spring, the valve 1 will return to the position of Figure 3, in which position the pressure behind the piston 15 still remains at its maximum, the opening 18 being still closed. However, the chamber 20 is then placed in communication with the rear of the piston 15 through the opening 17, groove 4 and holes 5. The piston valve 2 having again closed the orifice 19, the pressure of the fluid will be exerted on the valve 1 and, being added to the tension of the spring 10, will cause said valve to return sharply to the position of Figure 2, the rear of the piston 15 being placed in communication with the outside of the plate through the openings 17 and 18. The instantaneous disengagement of the clutch is thus brought about at a lower speed than that for its engagement.

The valve will remain in this position as long as the engine is idling, the clutch being disengaged, and it will be possible, by actuating the accelerator of the engine, to bring the clutch into engagement again.

If, on the other hand, the engine stops, the centrifugal force exerted on the valve-mass assembly will be eliminated and the spring 13 will return said assembly to the position of Figure 1, in which position the chamber behind the piston 15 becomes fluid-tight, thus enabling the engine to be started again by the vehicle.

The various problems under consideration are therefore positively solved by the valve of this invention:

(a) Starting the engine by pushing or pulling the vehicle, the engagement of the clutch being made possible by means of pressure fluid supplied from a source which is independent of the rotation of the engine;

(b) Very gradual engagement of the clutch, the pressure of fluid inside the clutch being proportional to the speed of rotation of the engine, due to the fact that the pressure of the fluid is exerted on the valve, against the centrifugal force, until the requisite pressure for total engagement of the clutch is reached;

(c) Instantaneous disengagement of the clutch at a speed of rotation very distinctly lower than that for the engagement of the clutch.

The various speeds of starting the engine, the speed of rotation corresponding to the total engagement of the clutch, and also the speed for which the instantaneous disengagement of the clutch is obtained, can be selected at will by modifying the weight of the valve 1 and the mass 8, the force of the springs 10 and 13, the cross-section of the valve 1, or some or all of these conditions at the same time.

The fitting of a valve according to the invention on a clutch having hydraulically compressed discs in no way interferes with the starting of the engine by means of a usual electric, compressed air, inertia, or other starting apparatus. In this case, the change speed gear being in neutral, the compression of the clutch disc that might occur, owing to the supply of pressure fluid by the pump, before the speed of rotation is sufficient to bring the valve into position for disengagement as in Figure 2, would have no effect on the starting of the engine.

In the case of a group of several clutches each controlling a speed, or a group of speeds, the duct 16 can be arranged to place the rear end of the pistons of all the clutches in communication with each other, in which case a single valve device according to the invention will be required. On the other hand, for certain applications, it will be advantageous to fit such a device to each clutch, the chambers at the rear of the pistons 15 being in this case entirely independent of each other.

Having now particularly described and ascertained the nature of my said invention and in what manner the same is to be performed, I declare that what I claim is:

1. In a control device for a fluid operated clutch having an annular pressure chamber and an annular piston slidable in the chamber, comprising a valve body member constructed and arranged to be rotated about an axis and having a recess therein disposed radially with respect to such axis of rotation: a centrifugal valve member slidable in the recess, a lateral pressure supply port and a lateral pressure delivery port at substantially the same level lengthwise of the recess, a radial pressure exhaust port at the outer end of the recess, and a fluid connection from the pressure chamber to the pressure supply port, said valve member comprising two radially aligned inner and outer relatively movable members and a separate spring urging each member in opposition to centrifugal force, the outer member having three control surfaces spaced from each other axially thereof and means by-passing the middle one of said surfaces, said springs being so calibrated that the outer member occupies a position whereat the intermediate control surface thereof closes the pressure supply and delivery ports when the speed of rotation of the valve body member is below a first predetermined speed, the pressure exhaust port being open at such time, the inner and outer members moving together radially outward under the influence of centrifugal force to a position whereat the intermediate control surface uncovers the pressure supply and delivery ports and the radially outer control surface closes the radial pressure exhaust port thereby to establish a communication between the supply port and both the delivery port and the outer end of the recess while closing off communication between the outer end of the recess and the exterior of the valve body member, fluid under pressure being supplied through said means to the outer end of the recess to assist said springs, when the speed exceeds said first predetermined speed but is less than a further predetermined speed, and means limiting further movement of the inner member but permitting further gradual movement of the outer member to a position whereat the radially inner control surface closes the pressure supply and delivery ports to interrupt communication thereof with the outer end of the recess while the radial exhaust port remains closed by the radially outer control surface when the speed is in excess of said further predetermined speed, and permitting still further movement of said outer member to an end position whereat the pressure supply and delivery ports remain closed by said radially inner control surface but the radial exhaust port is uncovered by the radially outer control surface to effect communication between the outer end of the recess and the exterior of the valve body and vent the fluid from the end of the recess when the speed exceeds a still further predetermined speed thereby to free the inner member from pressure exerted thereon by fluid in the recess.

2. A control device as in claim 1, wherein the two relatively movable members comprise a valve member proper and a centrifugal mass, the valve member proper and the mass being radially movable together in opposition to one of said springs thereby to uncover the lateral pressure supply port and the pressure delivery port when the speed of rotation of the rotary valve body member exceeds said first predetermined speed.

3. A control device as in claim 2, the centrifugal mass having an abutment integral therewith, means being provided within the recess to cooperate with the abutment and arrest movement of the centrifugal mass when said further predetermined speed of the rotary valve body member is reached, the valve member being free to continue its movement due to centrifugal force, in opposition to the other spring.

4. A control device as in claim 1, wherein one of the two relatively movable members comprises a valve member proper movable in the radial recess, the recess being provided with two diametrically opposed lateral pressure supply and delivery ports and the valve member proper having a peripheral annular groove whereby the two lateral pressure supply and delivery ports communicate with one another for a predetermined position of the valve member proper, said valve member proper also having at least one longitudinal bore extending from the groove to the radially outward face of the valve member proper.

5. A control device as in claim 1, wherein the two relatively movable members comprise a valve member proper and a cylindrical centrifugal mass, the recess having a guide lining therein wherein the valve member proper and the centrifugal mass are slidable, the mass having a flange extending therefrom to abut against the radially inner end of the lining thereby limiting radially outward movement of the centrifugal mass, the spring associated with the centrifugal mass being housed between the radially outer end of the mass and an internal shoulder of the lining, and the spring associated with the valve member proper being housed in a longitudinal recess of the centrifugal mass, the valve member proper having a stem extending through the mass and carrying an abutment at the radially inner end thereof between which and the mass said second spring is compressed when the valve member proper is urged by centrifugal force beyond the position where movement of the mass is limited.

HENRI GRANDGIRARD.

REFERENCES CITED

The following references are of record in the file of this patent:

UNITED STATES PATENTS

| Number | Name | Date |
|---|---|---|
| 976,174 | Henry | Nov. 22, 1910 |
| 2,328,091 | Nutt et al. | Aug. 31, 1943 |
| 2,328,092 | Nutt et al. | Aug. 31, 1943 |
| 2,440,589 | Kegresse | Apr. 27, 1948 |